United States Patent Office 2,954,256
Patented Sept. 27, 1960

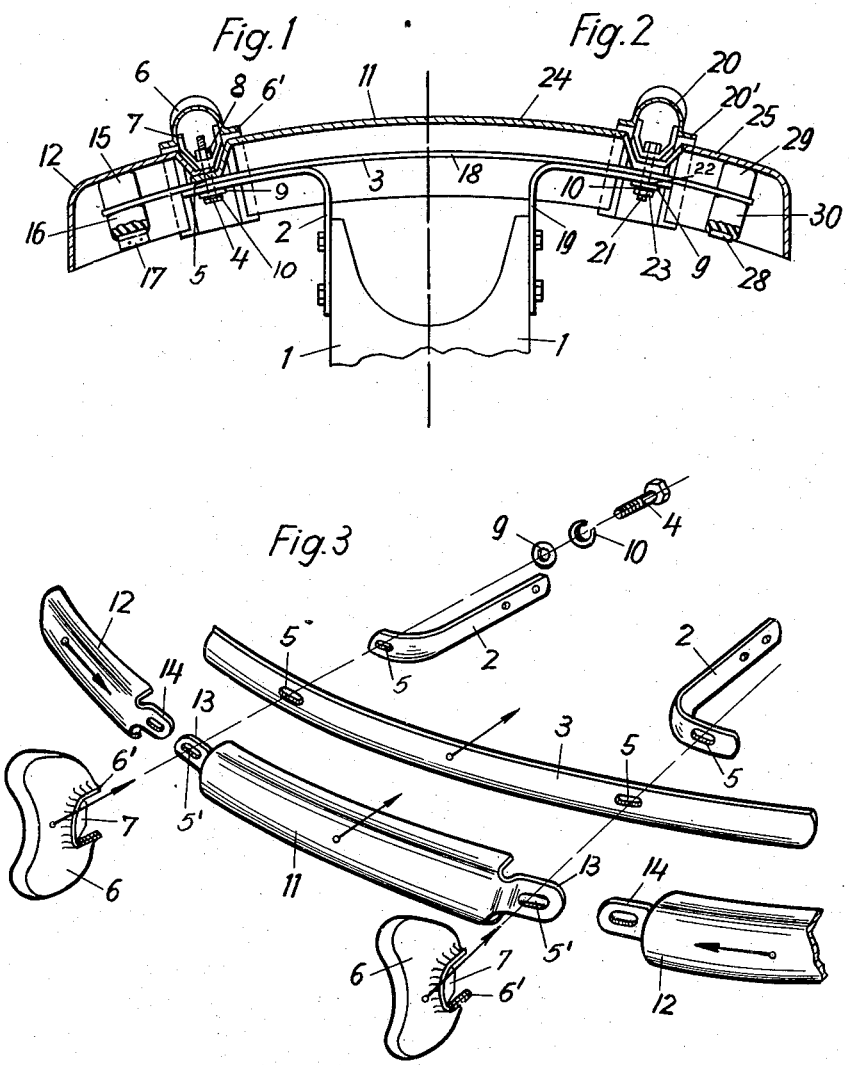

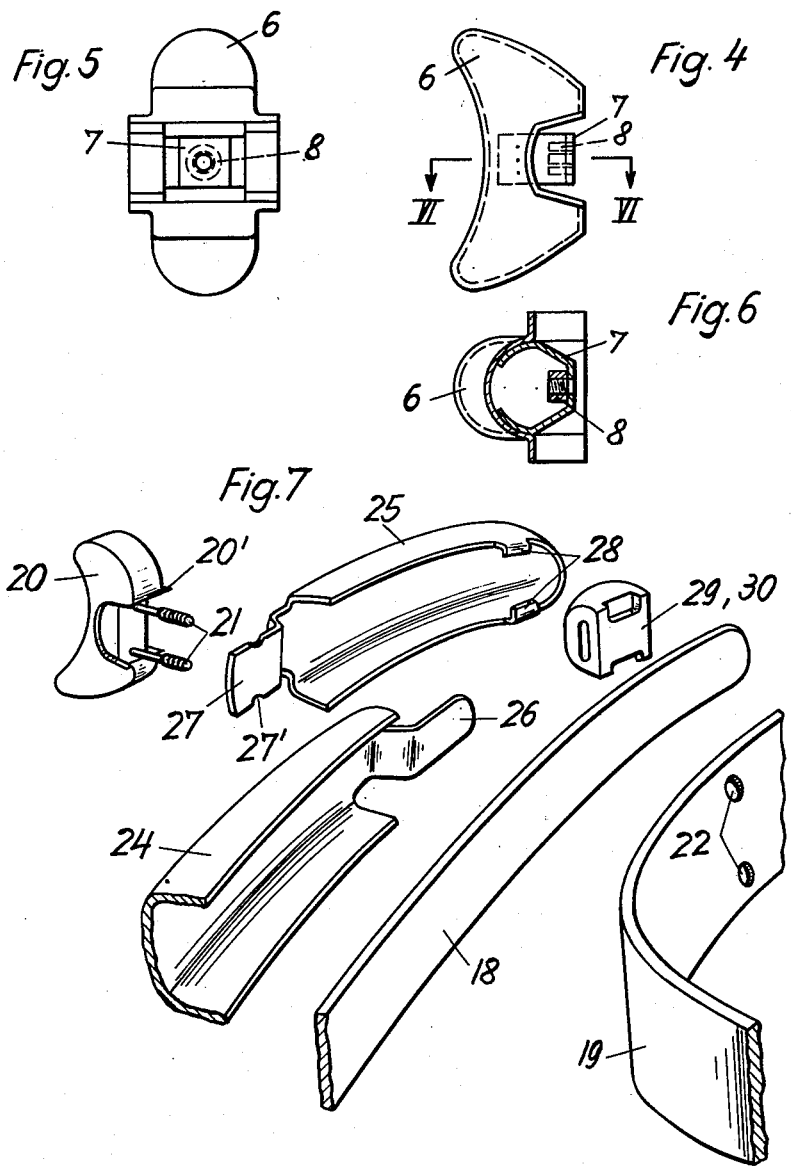

2,954,256

AUTOMOBILE BUMPER

Béla Barényi, Stuttgart-Rohr, Germany, assignor to Daimler-Benz Aktiengesellschaft, Stuttgart-Unterturkheim, Germany Filed Apr. 16, 1954, Ser. No. 423,740

Claims priority, application Germany Apr. 24, 1953

14 Claims. (Cl. 293—70)

The present invention relates to improvements in automobile bumpers, and more particularly to a bumper consisting of several parts and including a one-piece guard rail.

It is the object of the present invention to provide a novel multiple bumper unit consisting of an outer bumper and a one-piece inner guard rail or shock absorber which has the advantage over prior designs that the outer bumper safely encloses and protects the shock-absorbing inner rail and provides a simplified and improved type of mounting of the bumper on the vehicle.

An essential feature of the invention resides in providing an outer bumper and a one-piece shock-absorbing rail in the form of two separate elements and combining them so as to form a single unit by having the outer bumper completely hide the inner rail from view and enclose the same at least on three sides.

Another important feature of the invention resides in combining an outer bumper consisting of a plurality of sections with a one-piece inner guard rail in order to form a single unit in such a manner that the individual parts mutually support each other so as to provide a more adequate protection for the vehicle than was achieved with prior bumper designs.

Another valuable feature of the new bumper unit resides in the fact that the various elements thereof can be easily assembled and individually replaced, if damaged, thus only the particular part damaged must be replaced, which eliminates the expense of an entire new bumper unit.

Another feature of the invention resides in the novel manner of mounting the outer and inner bumper rails so that not only the outer ends of the two rails are secured together but that they are also securely connected by a pair of bumper guards projecting from the outer bumper and gripping the two rails on their upper and lower edges to prevent them from shifting laterally relative to each other.

Another feature of the invention resides in the use of an outer rail or bumper which consists of three individual, but interconnected, sections, with the bumper guards completely hiding the joints between these sections and solidifying the same.

Still another feature of the invention resides in assembling and securing the various parts of the bumper unit to the usual mounting bars of the vehicle merely by means of two bolts.

Further objects, features, and advantages of the present invention will appear from the following detailed description thereof and the accompanying drawings, in which Fig. 1 shows a horizontal cross section through the left half of a bumper unit according to the invention;

Fig. 2 is a view similar to Fig. 1, but showing a modification of the invention on the right half of the bumper;

Fig. 3 shows an exploded view of the individual parts of the embodiment shown in Fig. 1;

Figs. 4 and 5 show a bumper guard according to the embodiment shown in Figs. 1 and 3 viewed in two different directions;

Fig. 6 shows a cross section taken alone line VI—VI of Fig. 4; while

Fig. 7 shows an exploded view of the individual parts of the embodiment shown in Fig. 2.

Referring to Figs. 1 and 3 to 6 of the drawings, the left and right sides of the front of the car frame 1 each carry a bumper support 2 on which the transverse shock-absorbing rail 3 is mounted by means of bolts 4 passing through apertures 5, and also securing bumper guards 6 of suitable shape thereto. For receiving the bolts 4, each of the guards 6 is provided with a bent strap 7 carrying a nut 8 so as not to be turnable therein and preferably welded thereon. Each bolt is further secured in the usual manner by a washer 9 and a spring ring 10.

The bumper guards 6 according to the invention serve not only the usual purpose of protecting the bumper rail and carrying the nut 8 to mount the entire bumper on the supports 2, but also of covering the joints between a central bumper section 11, which may be used if desired for mounting the license plate, and the two lateral sections 12 so that the three-part outer rail 11, 12 appears to be made of one piece. The sections 11 and 12 carry on their mutually adjacent ends extensions 13 and 14 with suitable apertures 5' therein through which the bolts 4 are passed to secure them to each other. The three sections 11 and 12, except for the extensions 13 and 14, are of substantially U-shaped cross section, and, when secured together, the guards 6 completely hide the cut-off side arms of the U where extensions 13 and 14 abut, with the outwardly bent portions 6' overlapping these cut-off portions. The outer ends of the sections 12 may be additionally supported by the inner rail 3 by the use of elastic cushions 15 and 16, the front cushions 15 being interposed between the outer ends of the rail 3 and the U-shaped rear wall of the section 12 and the rear cushions 16 between the rail 3 and brackets 17 secured to the rear edges of the side arms of the U-shaped section.

According to the modification of the invention, as shown in Figs. 2 and 7, the inner rail or shock absorber 18 is mounted on the front end 1 of the car frame by means of a bumper support 19. For securing the various bumper sections together, the bumper guards 20 each have fixed thereto a pair of stay bolts 21 which engage the one-piece inner rail 18 on the outer edges thereof, then pass through suitable apertures 22 in the support 19, and are secured thereto by washers 9, spring rings 10, and nuts 23. Thus, the rail 18 may be secured to the car body without being weakened by any holes or apertures and is able to withstand greater shocks, especially along its outer ends.

This modified design also permits the outer, sectional rail or bumper to be mounted without being weakened by any holes therein. Similarly as in the embodiment shown in Figs. 1 and 3 to 6, this outer rail also consists of a central section 24 and two outer sections 25, all of substantially U-shaped cross section so as to enclose the inner rail 18 on three sides, the sectional rail in all embodiments thus constituting a container means for the inner rail. The three sections 24 and 25 are secured together by tonguelike extensions 26 and 27 projecting beyond the U-shaped profile of the respective sections, which are held in contact with each other by forceful application of the nut 23. In order to prevent vertical movement of the sections 24 and 25 relative to each other, the tongues 26 and 27 are made of a width so as to fit snugly between the two stay bolts 21. For additional security the tongues, at least of the outer sections 25, may be made slightly wider than the distance between stay bolts 21, and be provided with semi-circular apertures 27' in which the bolts are inserted. When secured together the bumper guards 20 will completely hide the joints of the three sections 24 and 25, with the outwardly bent portions 20' overlapping the cut-off edges of the U-shaped section.

Relative displacement of the individual rails and rail sections is also prevented, just as in the embodiment shown in Figs. 1 and 3 to 6, by the bracing action of the one-piece inner rail 18. The outer ends of the outer sections 25 of the bumper rail are provided with brackets 28, which may either be welded on the rear edges of the U-shaped section as indicated in Fig. 1 or consist of inwardly bent, integral projections as shown in Fig. 7. These projections 28 additionally secure the outer ends of the outer and inner rails together and brace them relative to each other. Like the embodiment of Figure 1, resilient cushions may also be provided on either side of the inner rail 18 to improve such bracing action. These are of duplicate construction, one of them, 29, being shown. Similarly as in the embodiment shown in Fig. 1, these cushions will be held in place by being enclosed almost entirely by the U-shaped walls of the outer rail sections 25 and the inwardly bent projections 28 thereon.

While the foregoing description sets forth in detail what we regard as the preferred embodiments of our invention, it is to be understood that numerous changes may be made therein without departing from the spirit and scope of the invention as defined in the appended claims.

Having thus described my invention, what I claim as new is:

1. In combination with a vehicle having a frame, a bumper unit comprising supporting means on said frame, a one-piece inner rail spaced outwardly of said frame and extending transversely thereof, a multi-sectional rail extending along said inner rail, said multi-sectional rail being of substantially U-shaped cross section and constituting a hollow containing means, said inner rail being disposed within the confines of said hollow containing means, the sections of said multi-sectional rail overlapping at mutually adjacent ends thereof and means for securing both said rails to said supporting means in the area of said mutually adjacent ends of the sections of said multi-sectional rail.

2. In combination with a vehicle having a frame, a bumper unit comprising supporting means on said frame, a one-piece inner rail spaced outwardly of said frame and extending transversely thereof, a multi-sectional rail extending along said inner rail, said multi-sectional rail being of substantially U-shaped cross section and constituting a hollow containing means, said inner rail being disposed within the confines of said hollow containing means, the sections of said outer rail overlapping at mutually adjacent ends thereof, and means common to said mutually adjacent ends and to said inner rail for securing said ends and said inner rail to said supporting means.

3. In combination with a vehicle having a frame, a bumper unit comprising supporting means mounted on said frame, an inner rail spaced outwardly of said frame and extending transversely thereof, a sectional rail extending along said inner rail, said sectional rail being of substantially U-shaped cross section and constituting a hollow containing means, said inner rail being disposed within the confines of said hollow containing means, said sectional rail comprising a central and two lateral sections having overlapping projections on their adjacent ends, a pair of bumper guards covering said projections and said adjacent ends, and only two nut and bolt means securing the central and lateral sections together as well as the bumper guards and both rails to said supporting means.

4. In combination with a vehicle having a frame, a bumper unit comprising supporting means mounted on said frame, a one-piece inner rail spaced outwardly of said frame and extending transversely thereof, a sectional rail extending along said inner rail, said sectional rail being of substantially U-shaped cross section and constituting a hollow containing means, said inner rail being disposed within the confines of said hollow containing means, said sectional rail comprising a central and two lateral sections having overlapping projections on their adjacent ends, a pair of bumper guards covering said projections and said adjacent ends, and a plurality of bolts for securing said guards and said central and lateral sections to said supporting means and for clamping said inner rail securely between said projections and said supporting means.

5. In combination with a vehicle having a frame, a bumper unit comprising supporting means mounted on said frame, a one-piece inner rail spaced outwardly of said frame and extending transversely thereof, a sectional rail extending along said inner rail, said sectional rail being of substantially U-shaped cross section and constituting a hollow containing means, said inner rail being disposed within the confines of said hollow containing means, said sectional rail comprising a central and two lateral sections having overlapping projections on their adjacent ends, a pair of bumper guards covering said projections and said adjacent ends, and at least one pair of bolts, secured to each of said guards and said supporting means, said projections and said inner rail having a width corresponding to the distance between said bolts so as to be securely clamped between said guards and supporting means.

6. In combination with a vehicle having a frame, a bumper unit comprising supporting means mounted on said frame, a one-piece inner rail mounted on said supporting means, said inner rail having ends and being spaced outwardly of said frame and extending transversely thereof, a sectional rail extending along said inner rail, said sectional rail being of substantially U-shaped cross section and constituting a hollow containing means, said inner rail being disposed within the confines of said hollow containing means said sectional rail comprising a central and two lateral sections, and elastic cushioning means interposed between said sectional rail and said inner rail near said ends of said inner rail, and means intermediate said elastic cushioning means for securing said sections of said sectional rail and said inner rail to said supporting means.

7. In combination with a vehicle having a frame, a bumper unit comprising supporting means mounted on said frame, a one-piece inner rail having unbroken surfaces and being spaced outwardly of said frame and extending transversely thereof, a sectional rail extending along said inner rail, said sectional rail being of substantially U-shaped cross section and constituting a hollow containing means, said inner rail being disposed within the confines of said hollow containing means, said sectional rail comprising a central and two lateral sections having overlapping projections on their adjacent ends, a pair of bumper guards covering said projections and said adjacent ends, at least one pair of bolts secured to each of said guards and said supporting means, said projections and said inner rail having a width corresponding to the distance between said bolts so as to be securely clamped between said guards and said supporting means and to be prevented from sliding vertically by said bolts, and elastic cushioning means interposed between said sectional rail and said inner rail near the ends of said inner rail.

8. In combination with a vehicle having a frame, a bumper unit comprising a supporting means mounted on said frame, an inner rail mounted on said supporting means, said inner rail being spaced outwardly of said frame and extending transversely thereof, and a sectional rail of substantially U-shaped cross section extending along said inner rail and constituting a hollow containing means, said inner rail being within the confines of said hollow containing means, said sectional rail comprising a central section and two lateral sections, said central section having projecting end portions and said lateral sections each having a projecting end portion in overlapping relationship with said end portions on said central section, and means for securing said sectional rail to said inner rail, said means including means cooperating with said adjacent ends for securing said ends together.

9. In combination with a vehicle having a frame, a bumper unit comprising supporting means mounted on said frame, an inner rail spaced outwardly of said frame and extending transversely thereof, a sectional rail of substantially U-shaped cross section extending along said inner rail and constituting a hollow containing means, said inner rail being within the confines of said hollow containing means, said sectional rail comprising a central and two lateral sections, overlapping joint parts on adjacent ends of said sections, a pair of bumper guards covering said joint parts, and means for securing said joint parts together and means for securing said guards, said sectional rail, and said inner rail to said supporting means, means for securing said joint parts together being comprised in said means for securing said guards.

10. In combination with a vehicle having a frame, a bumper unit comprising supporting members mounted on said frame, an inner rail mounted on said supporting members, said inner rail being spaced outwardly of said frame and extending transversely thereof, a sectional rail of substantially U-shaped cross section extending along said inner rail and constituting a hollow containing means, said inner rail being disposed within said hollow containing means, said sectional rail comprising a central section and two lateral sections, said bumper unit further including a pair of bumper guards between adjacent ends of said sections, connecting means for said bumper unit including two spaced means for securing said bumper guards, said sections of said sectional rail, and said inner rail in assembled relationship, each of said two spaced means further including means for securing one of said bumper guards, one of said lateral sections, said central section and said inner rail to one of said supporting members, each of said two spaced means further comprising a nut member within one of said bumper guards and a bolt threadedly engaging said nut.

11. The combination according to claim 10, wherein said connecting means for said bumper unit further includes elastic cushioning means interposed between said sectional rail and said inner rail near the ends of said inner rail.

12. The combination according to claim 10, wherein said nut is fixedly secured to said one of said bumper guards.

13. The combination according to claim 10, wherein end projections are provided on said central section and on said lateral sections, said end projections on said central section overlapping the said end projections on said lateral sections.

14. The combination according to claim 13, wherein all of said end projections are provided with apertures, the apertures in the end projections of said central section registering with the apertures in the end projections of said lateral sections, said bolt in each of said two spaced means passing through two of said registering apertures.

References Cited in the file of this patent

UNITED STATES PATENTS

| | | |
|---|---|---|
| 1,505,365 | Banschbach | Aug. 19, 1924 |
| 1,858,541 | Duffy | May 17, 1932 |
| 1,865,801 | Tarte | July 5, 1932 |
| 2,052,300 | Jandus | Aug. 25, 1936 |
| 2,259,464 | Halladay | Oct. 21, 1941 |
| 2,270,533 | Knutte | Jan. 20, 1942 |
| 2,291,370 | Brunner | July 28, 1942 |
| 2,308,094 | Mears | Jan. 12, 1943 |
| 2,593,586 | Maag | Apr. 22, 1952 |
| 2,667,374 | Signori | Jan. 26, 1954 |
| 2,672,363 | Buchanan | Mar. 16, 1954 |
| 2,715,037 | Maag | Aug. 9, 1955 |

FOREIGN PATENTS

| | | |
|---|---|---|
| 17,989 | Australia | June 13, 1934 |
| 274,732 | Great Britain | July 28, 1927 |
| 595,094 | France | Sept. 25, 1925 |
| 725,091 | France | Mar. 7, 1932 |